(No Model.)
H. LECOUTEUX & E. GARNIER.
FLEXIBLE JOINT OR CONNECTION PIPE.
No. 338,848. Patented Mar. 30, 1886.
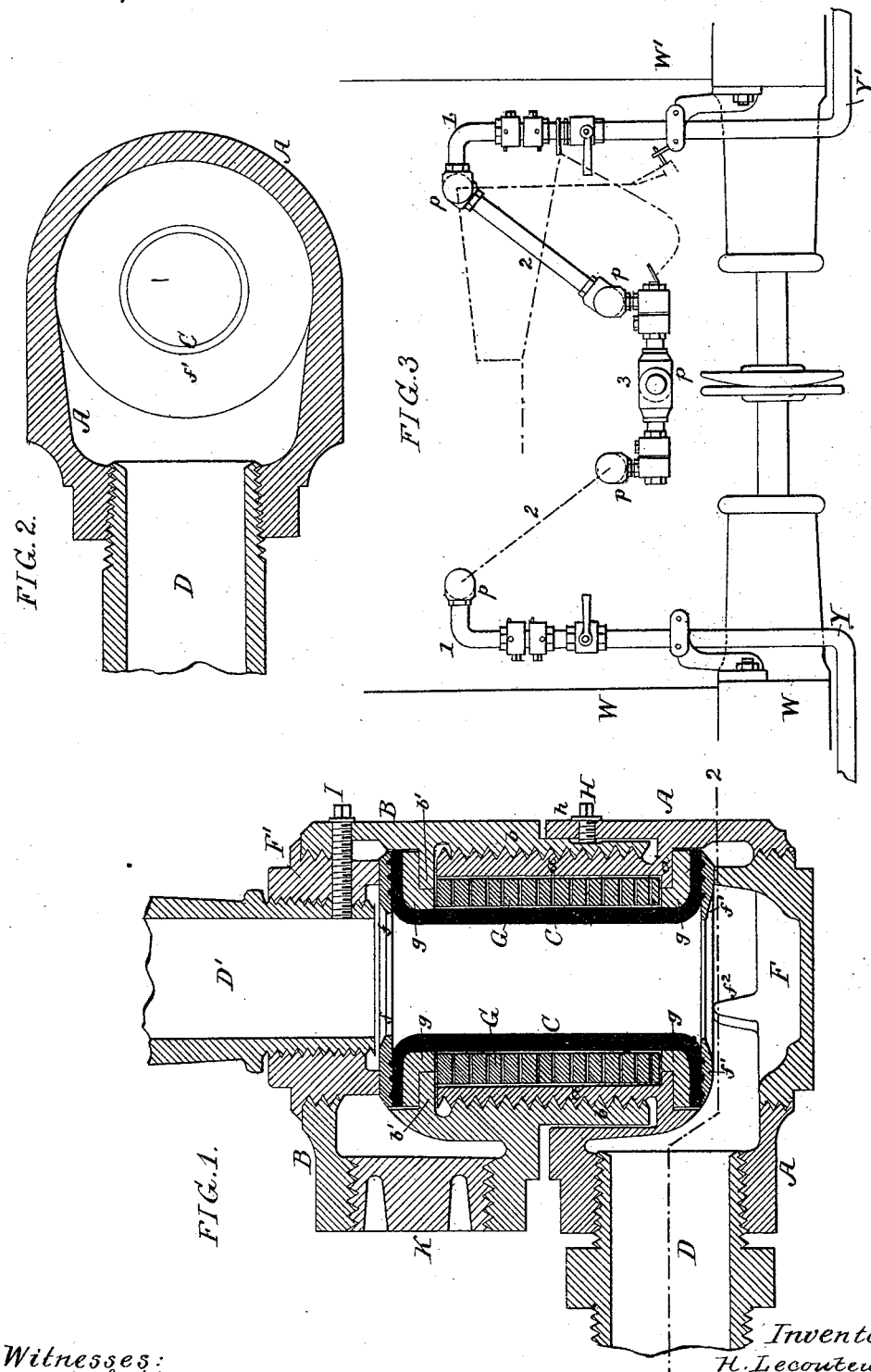
Witnesses:
David S. Williams
Alex Barkoff
Inventors:
H. Lecouteux &
Emil Garnier
by their Attorneys
Howen and Sons

UNITED STATES PATENT OFFICE.

HIPPOLYTE LECOUTEUX AND EMILE GARNIER, OF PARIS, FRANCE.

FLEXIBLE JOINT OR CONNECTION-PIPE.

SPECIFICATION forming part of Letters Patent No. 338,848, dated March 30, 1886.

Application filed March 2, 1885. Serial No. 157,558. (No model.) Patented in England January 17, 1885, No. 704.

*To all whom it may concern:*

Be it known that we, HIPPOLYTE LECOUTEUX and EMILE GARNIER, of Paris, in the Republic of France, have invented Improvements in Flexible Joints or Connection-Pipes, employed in Working Brakes, or for other similar conditions, of which the following is a specification.

The main object of our invention is to construct a flexible coupling for tubing and pipes, which, while allowing a free movement of the sections of pipe or tube, will form a tight joint, and this object we attain as hereinafter described.

In the accompanying drawings, Figure 1 is a sectional view of our improved coupling. Fig. 2 is an inverted section on the line 1 2, Fig. 1; and Fig. 3 is a view showing the application of our improved coupling to the air-brake pipes of railway-cars.

Referring to Fig. 3, W W' represent the ends of adjoining cars, and Y Y' the piping on the two cars for the air-brake. The piping forming the connection between the two cars is made in sections 1 2 3, with our improved form of coupling at the joints P P, for the extent of movement necessary between the two cars.

Our coupling, as illustrated in Figs. 1 and 2, consists of two sockets, A and B, the socket A having an externally-threaded portion, $a$, adapted to a corresponding internal thread on the portion $b$ of the socket B, the portion $a$ of the socket being tubular. Each socket is provided with two screw-threaded openings at right angles to each other, and in the present instance the opening in the side of the socket A receives the threaded end D of the inlet pipe or coupling, while the opening in the end of the socket A is closed by a plug, F. The opening in the end of the socket B is closed by a screw-plug or collar, F', into which is screwed the outlet-pipe D', while the opening in the side of the socket B is closed by a suitable screw-plug, K. This arrangement is employed where the pipes D D' are at right angles to each other; but where they are side by side, or parallel, the position of either of the pipes D D' will be changed to fit in the end of the socket A, or the side of the socket B, as will be readily understood.

Within the tubular portion $a$ of the socket A is arranged a series of rings, G, and within this series of rings is a tube, C, of india-rubber, or similar flexible material, the ends of which are flared out and clamped between rubber washers $g$ and grooved washers $f f'$. The washers $g$ are adapted to annular flanges or seats $a' b'$ on the sockets A and B, and the grooved washers $f f'$ are held in place by the plugs F F'. The plug F is provided with fingers $f^2$—three in the present instance—to bear on the washer $f'$, allowing for the free passage of the fluid from the pipe D to the interior of the tube C; but the plug F' bears on the washer $f$ all around, so as to make a close joint at that point.

In order to hold the plug F' and the pipe D' from coming loose by the movement of the two parts of the coupling, we provide a screw-pin, I, passing through from the socket B to the pipe D'.

The threads of the portions $a'$ and $b'$ of the two sockets are of such a slow pitch that one socket may be turned a portion of a revolution on the other without separating them to any appreciable extent, and in order to limit this movement of one socket on the other, we provide a stop-pin, H, on an arm, $h$, of the socket A, adapted to a curve in the portion $b$ of the socket B. With this construction of coupling it will be seen the adjoining sections of pipes can have the desired extent of movement with reference to each other without interfering with the tightness of the joint, the rubber tube C making an effectual closure, and at the same time being supported by the series of rings G against the pressure of the fluid. These rings are free to turn on each other, to facilitate the movement of the two parts of the coupling without having any injurious action on the tube C.

We claim as our invention—

1. The combination of the sockets A and B of the coupling fitted into each other and a flexible tube, C, covering the joint, with a series of supporting-rings, D, free to turn on each other, substantially as set forth.

2. The combination of the two sockets A and

B of a coupling, screw-threaded into each other and free to turn to a limited extent on each other, with an internal flexible tube having its opposite ends secured in the two sockets and covering the screw-joint, substantially as set forth.

In testimony whereof we have signed our names to this specification in the presence of two subscribing witnesses.

HIPPOLYTE LECOUTEUX.
   EMILE GARNIER.

Witnesses:
 LÉON FRANCKEUR,
 ROBT. M. HOOPER.